United States Patent
Lamendola

(10) Patent No.: US 10,648,791 B2
(45) Date of Patent: May 12, 2020

(54) CONFORMANCE TEST ARTIFACT FOR COORDINATE MEASURING MACHINE

(71) Applicant: Hexagon Metrology, Inc., North Kingstown, RI (US)

(72) Inventor: Charles Salvatore Lamendola, Hope Valley, RI (US)

(73) Assignee: Hexagon Metrology, Inc., North Kingstown, RI (US)

( * ) Notice: Subject to any disclaimer, the term of this patent is extended or adjusted under 35 U.S.C. 154(b) by 31 days.

(21) Appl. No.: 15/692,570

(22) Filed: Aug. 31, 2017

(65) Prior Publication Data
US 2018/0058840 A1    Mar. 1, 2018

Related U.S. Application Data

(60) Provisional application No. 62/382,546, filed on Sep. 1, 2016.

(51) Int. Cl.
| | | |
|---|---|---|
| G01B 11/00 | (2006.01) | |
| G01B 11/25 | (2006.01) | |
| G01B 21/04 | (2006.01) | |
| G01B 11/02 | (2006.01) | |

(52) U.S. Cl.
CPC .......... *G01B 11/005* (2013.01); *G01B 11/022* (2013.01); *G01B 11/2504* (2013.01); *G01B 21/042* (2013.01)

(58) Field of Classification Search
None
See application file for complete search history.

(56) References Cited

U.S. PATENT DOCUMENTS

| | | | |
|---|---|---|---|
| 3,941,484 A | 3/1976 | Dreyfus | |
| 6,055,329 A * | 4/2000 | Mufti | G01B 9/08 |
| | | | 250/559.12 |
| 6,147,357 A * | 11/2000 | Nicolesco | G01N 21/8806 |
| | | | 250/228 |
| 6,618,123 B2 * | 9/2003 | Uomori | G01S 7/4815 |
| | | | 348/131 |

(Continued)

FOREIGN PATENT DOCUMENTS

| | | |
|---|---|---|
| DE | 102006014509 A1 | 9/2007 |
| EP | 0094522 | 11/1983 |

OTHER PUBLICATIONS

International Searching Authority [EPO], International Search Report—International Application No. PCT/US2017/049651, dated Nov. 3, 2017, together with the Written Opinion of the International Searching Authority, 15 pages.

(Continued)

*Primary Examiner* — Kara E. Geisel
(74) *Attorney, Agent, or Firm* — Nutter McClennen & Fish LLP

(57) ABSTRACT

A test artifact for a coordinate measuring machine includes a calibrated standard and a convex background illumination surface. The calibrated standard, the convex background illumination surface and a vision sensor are positionable relative to one another so as to create a silhouette of the calibrated sphere in the vision sensor's field of view. The test artifact may thus be used to calibrate the coordinate measuring machine, and/or to assess the associativity between the vision sensor and another measuring sensor.

10 Claims, 13 Drawing Sheets

(56) References Cited

U.S. PATENT DOCUMENTS

| | | | | |
|---|---|---|---|---|
| 9,453,716 | B2* | 9/2016 | Kurahashi | B23Q 17/2457 |
| 9,752,869 | B2* | 9/2017 | Nayar | G01B 11/25 |
| 2002/0148275 | A1* | 10/2002 | Abbe | B25J 9/1692 |
| | | | | 73/1.01 |
| 2006/0227210 | A1* | 10/2006 | Raab | G01B 11/002 |
| | | | | 348/139 |
| 2012/0044504 | A1* | 2/2012 | Ohnishi | G01B 11/24 |
| | | | | 356/602 |
| 2012/0188380 | A1* | 7/2012 | Drescher | G01N 21/8806 |
| | | | | 348/180 |
| 2012/0188558 | A1* | 7/2012 | Yamagata | G01B 11/03 |
| | | | | 356/601 |
| 2014/0056495 | A1* | 2/2014 | Janssens | A61B 6/582 |
| | | | | 382/128 |
| 2014/0180620 | A1* | 6/2014 | Hicks | G01B 21/042 |
| | | | | 702/95 |
| 2015/0229907 | A1* | 8/2015 | Bridges | G01B 21/047 |
| | | | | 348/46 |
| 2015/0260859 | A1* | 9/2015 | Christoph | G01B 15/04 |
| | | | | 378/207 |

OTHER PUBLICATIONS

El-Hakim, et al., A Comparative Evaluation of the Performance of Passive and Active 3-D Vision Systems, Proc.: St. Petersburg Conference on Digital Photogrammetry, 12 pages (1995).

* cited by examiner

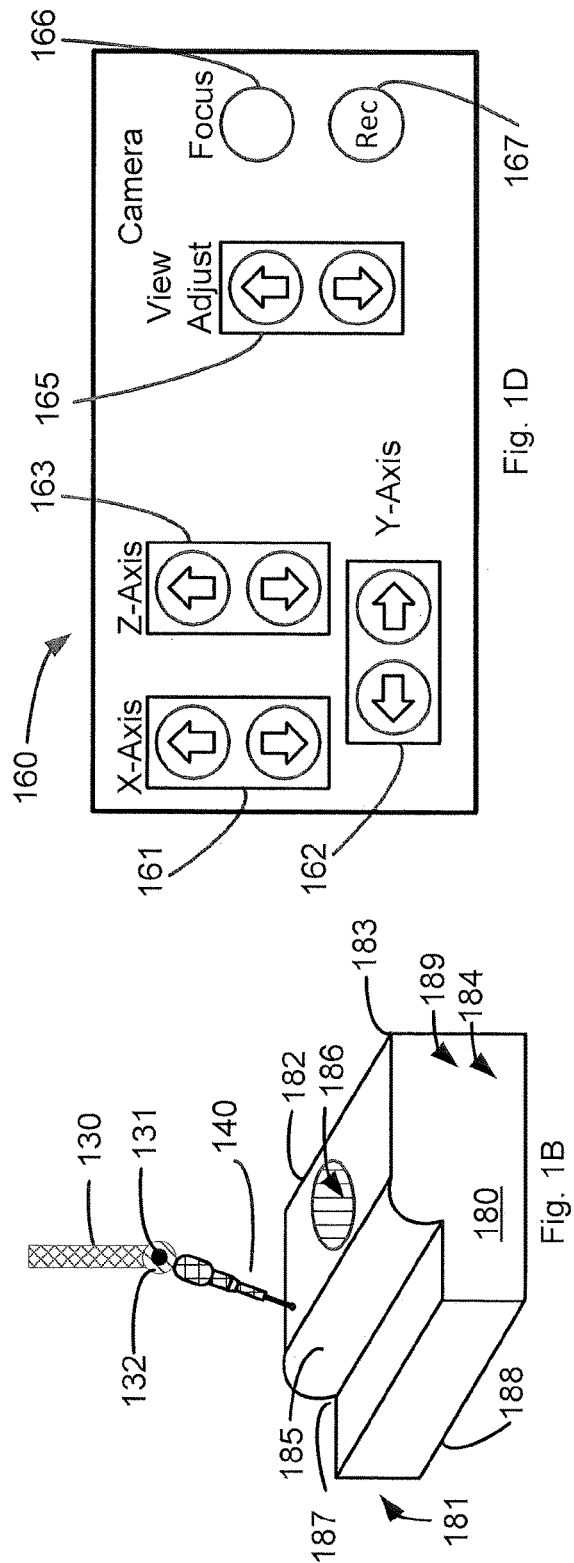
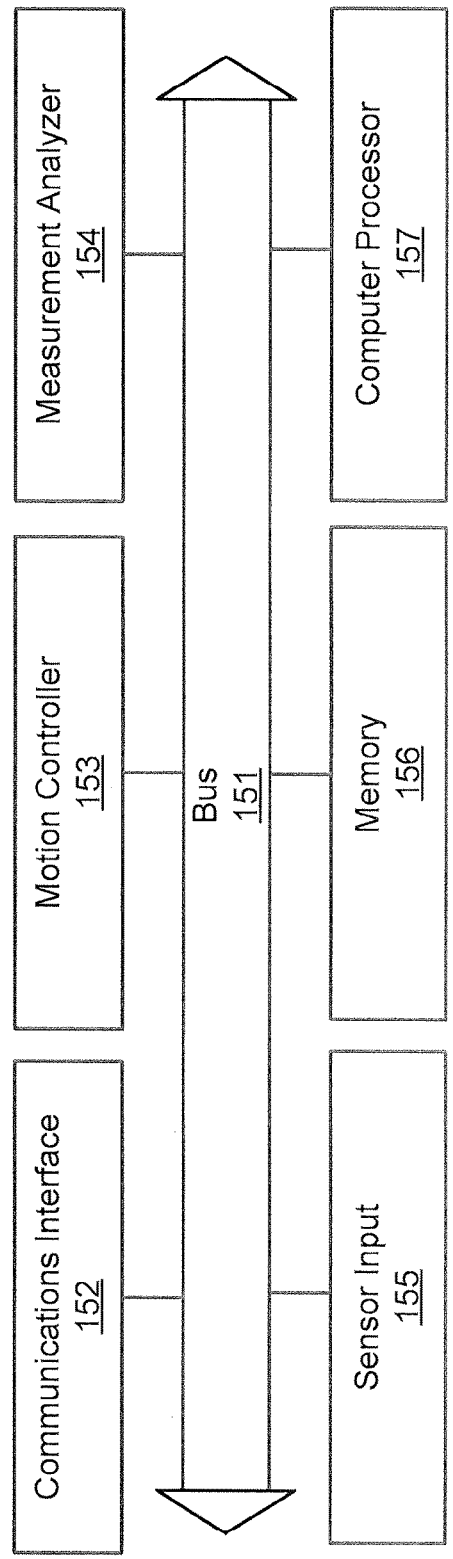

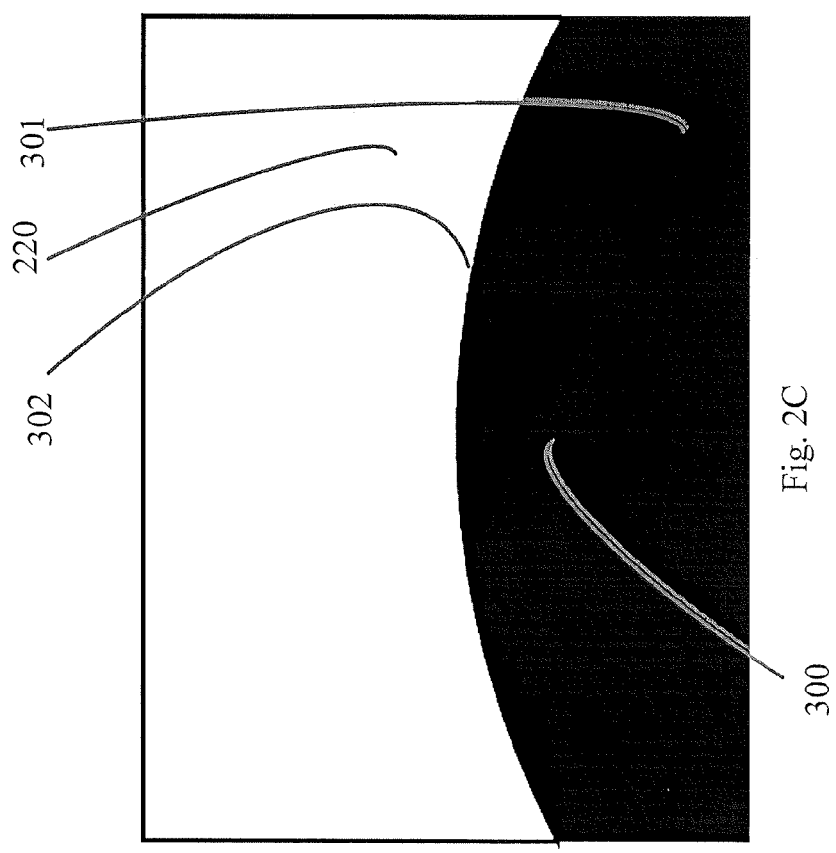

CONFORMANCE TEST ARTIFACT FOR COORDINATE MEASURING MACHINE

PRIORITY

This patent application claims priority from provisional U.S. patent application No. 62/382,546, filed Sep. 1, 2016, entitled, "Conformance Test Artifact," and naming Charles Salvatore Lamendola as inventor, the disclosure of which is incorporated herein, in its entirety, by reference.

TECHNICAL FIELD

The present disclosure generally relates to coordinate measuring machines and, more particularly, relates to systems and methods for verifying performance of coordinate measuring machine sensors.

BACKGROUND ART

Coordinate measuring machines (CMMs) are the gold standard for accurately measuring a wide variety of different types of work pieces/objects. For example, CMMs can measure critical dimensions of aircraft engine components, surgical tools, and machine parts. Precise and accurate measurements help ensure that their underlying systems, such as an aircraft in the case of aircraft components, operate as specified.

Some objects are measured to a fine precision, such as on the micron level. The accuracy of a CMM may depend, in part, on the calibration of the CMM and the accuracy of the measuring device (e.g., optical probe) used for the measurement.

A CMM may use one or more types of sensor, such as tactile sensors, touchless sensors, photographic sensors (e.g., video sensors), to measure a workpiece. Calibrating a CMM may involve causing the CMM to measure a calibration artifact of known dimensions, and take remedial steps (e.g., adjust the CMM and/or determine mathematical data for use in correcting measurement data) to mitigate differences between the measurements and the known dimensions of the artifact.

The ISO 10360-9 standard establishes specific procedures for verifying the performance of a CMM that uses multiple probing systems in contacting and non-contacting mode. The standard describes analysis of the quality of the associativity of multiple sensors (e.g., tactile and video sensors) along with their different operating conditions (e.g., the orientation of the sensor as defined by the articulation of a wrist) to assess whether different sensors at different wrist orientations can measure the same artifact and report data on the size, form, and location of that artifact that correlates within some tolerance zone.

For tactile sensors the artifact of choice has traditionally been a calibrated sphere.

For optical sensors, including video sensors, the choice of a sphere as the test artifact would present a unique set of challenges, including the challenge of illumination. The video sensor, for example, operates by detecting edges defined by some contrast in the greyscale analysis of the pixels seen by the sensor's field of view (FOV). In essence, such a sensor probes points by "looking" at the part and choosing the point where the part shows some contrast between black and white.

SUMMARY OF THE EMBODIMENTS

In accordance with one embodiment, a test artifact for calibrating a vision CMM includes a base configured to rest on a table of the CMM, and a calibrated standard suspended from the base. In one embodiment, the calibrated standard is a sphere or hemisphere, but in other embodiments may have other shapes.

The test artifact also includes a convex background illumination surface suspended relative to the base.

In some embodiments, the convex background illumination surface is positionable such that the calibrated standard is between the background illumination surface and a vision sensor such that light from the background illumination surface creates a silhouette of the calibrated sphere as seen from the vision sensor.

In some embodiments, the convex background illumination surface is reflective (and may be a passive reflector), and creates the silhouette by reflecting light towards the vision sensor. As an example, in some embodiments the light is generated by the vision sensor and transmitted towards the convex background illumination surface. In some embodiments, the convex background illumination surface is a light source that produces light.

The convex background illumination surface, in some embodiments, is configured such that its location can be controllably adjusted (i.e., it is moveably positionable) relative to the calibrated standard. Further, in some embodiments the convex background illumination surface is movable with respect to the calibrated standard, without moving the calibrated standard relative to the base.

Alternately, or in addition, some embodiments include a reflective hemisphere positioned between the base and the calibrated standard. For example, in some embodiments the reflective hemisphere in a fixed position between the base and the calibrated standard such that a line normal to the base passes through the reflective hemisphere and the calibrated standard.

Another embodiment is a method of illuminating a calibrated standard for use with a CMM having a vision sensor having a field of view. The method includes positioning the calibrated standard with the vision sensor's field of view; positioning a background illuminator such that the calibrated standard is between the background illuminator and the vision sensor; and illuminating background illuminator to create a silhouette of the calibrated standard within the vision sensor's field of view.

In some embodiments, the calibrated standard and the background illuminator are both suspended from a base, the base configured to rest on a table of the CMM. Moreover, in some embodiments the background illuminator is movably suspended from the base such that the background illuminator is movable relative to the calibrated standard without moving the calibrated standard relative to the base.

In some embodiments, the background illuminator includes a convex background illumination surface, and illuminating the background illuminator includes first illuminating the convex background illumination surface when the convex background illumination surface is in a first position relative to the calibrated standard, and subsequently illuminating the convex background illumination surface when the convex background illumination surface is in a second position relative to the calibrated standard. Further, in some embodiments, the method includes moving the vision sensor relative to the calibrated standard using a movable wrist, such that, after the vision sensor has been moved, the calibrated standard is positioned between the vision sensor and the background illuminator.

Yet another embodiment includes a method of assessing the associativity of a vision sensor used by a given CMM, and a second measuring sensor used by the given CMM. The method includes providing to the given CMM a test artifact, the test artifact having both a calibrated sphere, and a background illuminator. In some such embodiments, the background illuminator is a passive reflector.

The method includes orienting the test artifact and the vision sensor such that the calibrated sphere is between the vision sensor and the background illuminator so that the background illuminator produces, to the vision sensor, a silhouette of the calibrated sphere. The method then includes measuring the calibrated sphere with the vision sensor to produce a first set of measurements; measuring the same calibrated sphere with the second measuring sensor to produce a second set of measurements; and comparing the first set of measurements to the second set of measurements. The second measuring sensor may be a second vision sensor, or a tactile sensor or a non-contact sensor.

Some embodiments also include re-orienting the test artifact and the vision sensor to one or more additional positions (e.g., a second position, third position, etc.) such that the calibrated sphere is again between the vision sensor and the background illuminator so that the background illuminator produces, to the vision sensor, a silhouette of the calibrated sphere; and measuring the calibrated sphere with the vision sensor for a second time.

BRIEF DESCRIPTION OF THE DRAWINGS

The foregoing features of embodiments will be more readily understood by reference to the following detailed description, taken with reference to the accompanying drawings, in which:

FIG. 1B schematically illustrates an embodiment of a measuring sensor of a CMM measuring a workpiece;

FIG. 1C schematically illustrates an embodiment of a manual user interface of a CMM;

FIG. 1D schematically illustrates an embodiment of a control system of a CMM;

FIG. 2C schematically illustrates a silhouette of a portion of an embodiment of a calibration artifact;

DETAILED DESCRIPTION OF SPECIFIC EMBODIMENTS

Figure 1A:
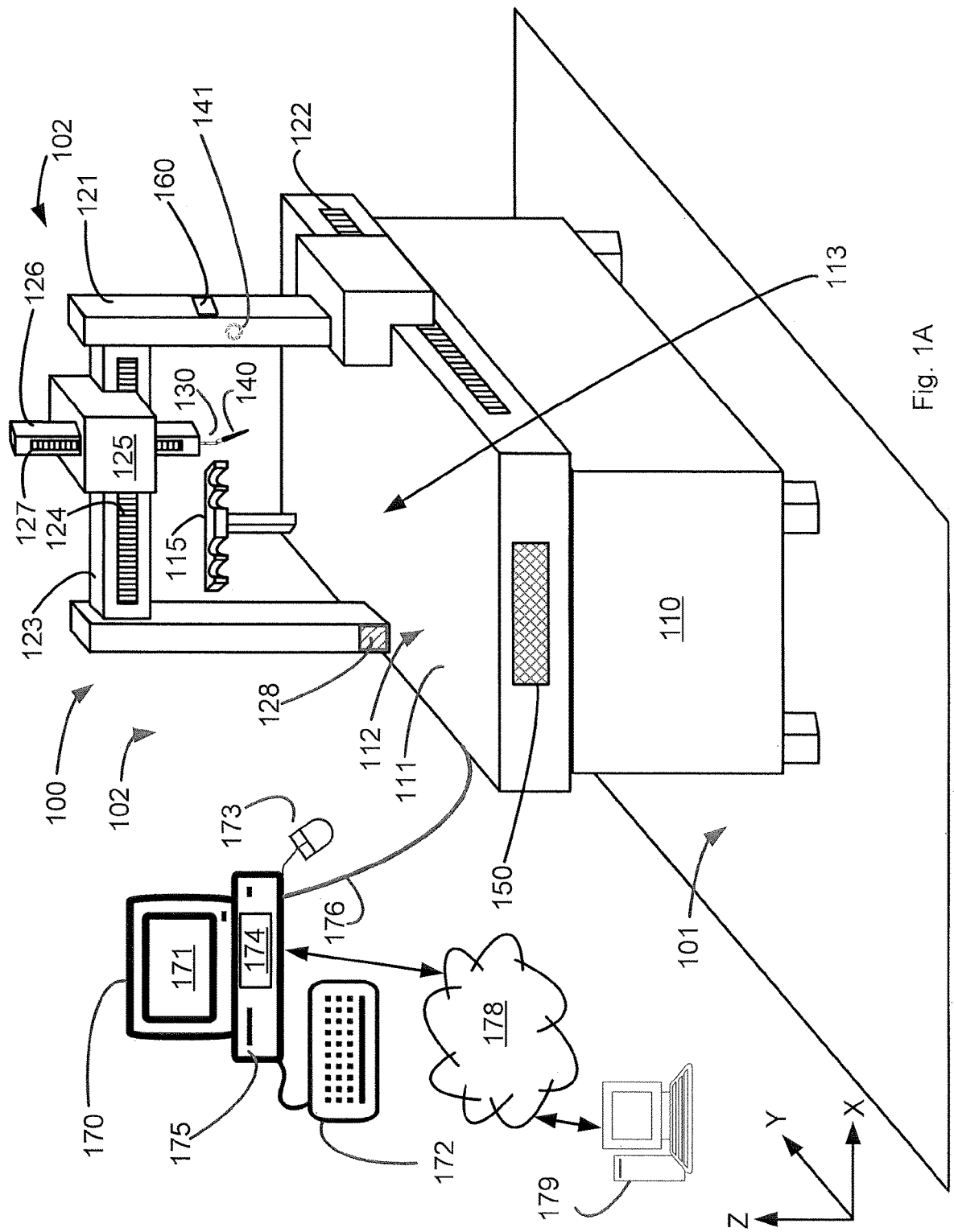
FIG. 1A schematically illustrates an embodiment of a CMM.

Various embodiments facilitate assessment of the accuracy of a CMM by providing a device that improves the assessment of the CMM's vision sensor, and which is also configured for assessing other measuring sensors of the CMM. This may be useful, for example, not only in testing and calibrating the CMM, but also to assessing the associativity of the CMM's sensors. Various embodiments enable different sensors at different wrist orientations to measure the same artifact and report data on the size, form, and location of that artifact that correlates within some tolerance zone. Some embodiments also facilitate verification of sensor performance.

FIGS. 1A-1D schematically illustrate a coordinate measurement machine 100 (hereinafter "CMM 100") that may be configured in accordance with illustrative embodiments.

As known by those in the art, a CMM is a system configured to measure one or more features of a workpiece 180. An illustrative embodiment of a workpiece 180 is schematically illustrated in FIG. 1B, and is included only to illustrate features that a workpiece 180 may have. Typically, a workpiece 180 has a specified shape with specified dimensions, which may be referred-to collectively as the "geometry" 181 of the workpiece 180. A workpiece 180 may also have surfaces, such as a flat surface 184, and a curved surface 185. A meeting of two surfaces may create an inside angle 187, an edge 182, or a corner 183. Moreover, each surface may have physical characteristic such as waviness 188 and/or surface finish 189, as known in the art. A workpiece 180 may also have a cavity 186, which may also be an aperture through the workpiece 180. As known in the art, a cavity 186 may have dimensions such as width and depth, which may in turn define an aspect ratio of the cavity 186.

CMM Base

In the illustrative embodiment of FIG. 1A, the CMM 100 includes a base 110 having a table 111. The table 111 of the CMM 100 defines an X-Y plane 112 that typically is parallel to the plane of the floor 101, and a Z-axis normal to the X-Y plane, and a corresponding X-Z plane and Y-Z plane. The table 111 also defines a boundary of a measuring space 113 above the table 111. In some embodiments, the CMM 100 includes a probe rack 115 configured to hold one or more measuring sensors 140. A movable part of the CMM 100 may move to the probe rack 115 and place a measuring sensor 140 into the probe rack 115, and/or remove another measuring sensor 140 from the probe rack 115.

Movable Parts

The CMM 100 also has movable features (collectively, 120) arranged to move and orient a measuring sensor 140 (and in some embodiments, a plurality of such devices) relative to the workpiece 180. As described below, movable features of the CMM 100 are configured to move and orient the measuring sensor 140, relative to the workpiece 180, in one dimension (X-axis; Y-axis; or Z-axis), two dimensions (X-Y plane; X-Z plane; or Y-Z plane), or three dimensions (a volume defined by the X-axis, Y-axis, and Z-axis).

Accordingly, the CMM 100 is configured to measure the location of one or more point on, or features of, the workpiece 180.

The CMM 100 of FIG. 1A is known as a "bridge" CMM. Movable features 120 of the bridge CMM 100 include a bridge 123 movably coupled to the base 110 by legs 121. The bridge 123 and legs 121 are controllably movable relative to the base 110 along the Y-axis.

To facilitate motion of the legs relative to the base 110, the legs 221 may be coupled to the base 110 by one or bearings 128. As known in the art, a bearing may be a roller bearing or an air bearing, to name just a few examples.

The movable features also include a carriage 125 movably coupled to the bridge 123. The carriage is configured to controllably move in the X-axis along the bridge 123. The position of the carriage 125 along the bridge 123 may be determined by a bridge scale 124 operably coupled to the bridge 123.

A spindle 126 is moveably coupled to the carriage 125. The spindle 126 is configured to controllably move in the Z-axis. The position in the Z-axis of the spindle 126 may be determined by a spindle scale 127 operably coupled to the spindle 126. The measuring sensor 140 is operably coupled to the spindle 126. Consequently, the measuring sensor 140 is controllably movable in three dimensions relative to a workpiece 180 in the measuring space 113.

In some embodiments, the measuring sensor 140 is moveably coupled to the spindle 126 by an articulated arm 130. For example, the measuring sensor 140 may be movably coupled to the arm 130 by a movable joint 131. The movable joint 131 allows the orientation of the measuring sensor 140 to be controllably adjusted relative to the arm 130, to provide to the measuring sensor 140 additional degrees of freedom in the X-axis, Y-axis, and/or Z-axis.

In other embodiments, which may be generally referred-to as "gantry" CMMs, the legs 121 stand on the floor 101, and the measuring space 113 is defined relative to the floor 101.

In yet other embodiments, the measuring sensor 140 is fixed to (i.e., not movable relative to) the base 110, and the table 111 is movable in one, two or three dimensions relative to the measuring sensor 140. In some coordinate measuring machines, the table 111 may also be rotatable in the X-Y plane, or in the Y-Z plane, or in the X-Z plane, or in any other plane that intersects the measurement envelope 113. In such embodiments, the CMM 100 moves the workpiece 180 relative to the measuring sensor.

In other embodiments, which may be generally referred-to as "horizontal arm" CMMs, the bridge 123 is movably coupled to the base 110 to extend in the Z-axis, and to be controllably movable along the Y-axis. In such a CMM, the arm 130 is controllably extendable in the X-axis, and controllably movable up and down the bridge 123 in the Z-axis.

In yet other embodiments, the arm 130 is articulated. One end of the arm 130 is fixed to the base 110, and a distal end of the arm 130 is movable relative to the base 110 in one, two or three dimensions relative to a workpiece 180 in the measuring space 113.

Sensors

In some embodiments, the measuring sensor 140 may be a tactile probe (configured to detect the location of a point on the workpiece 180 by contacting a probe tip to the workpiece 180, as known in the art), a non-contact probe (configured to detect the location of a point on the workpiece 180 without physically contacting the workpiece 180), such as a capacitive probe or an inductive probe as known in the art, or an optical probe (configured to optically detect the location of a point on the workpiece 180), to name but a few examples.

In some embodiments, the measuring sensor 140 is a vision sensor that "sees" the workpiece 180. Such a vision sensor may be a camera having a light sensor (e.g., a charge-coupled device), and one or more lenses, and is capable of focusing on the workpiece 180, or the measurement area 113, and configured to capture and record still images or video images. Such images, and/or pixels within such images, may be analyzed to locate the workpiece 180; determine the placement and/or orientation of the workpiece 180; identify the workpiece 180; and/or measure the workpiece 180, to name but a few examples.

In operation, the CMM 100 measures the workpiece 180 by moving the measuring sensor 140 relative to the workpiece 180 to measure the workpiece 180.

Some embodiments of a CMM 100 may include one, or more than one, camera 141 configured such that the measurement envelope 113 is within the field of view of the camera 141. Such a camera 141 may be in addition to a measuring sensor 140. The camera 141 may be a digital camera configured to capture still images and/or video images of the measurement envelope 113, a workpiece 180 on the CMM 100, and/or the environment around the CMM 100. Such images may be color images, black and white images, and/or grayscale image, and the camera 141 may output such images as digital data, discrete pixels, or in analog form.

Some embodiments of a CMM 100 may also include an environmental sensor 142 configured to measure one or more characteristics of the environment 102 in which the CMM is placed, and some embodiments may have more than one such environmental sensor 142. For example, an environmental sensor 142 may be configured to measure the temperature, pressure, or chemical content of the atmosphere around the CMM 100. An environmental sensor 142 may also be a motion sensor, such as an accelerometer or a gyroscope, configured to measure vibrations of the CMM caused, for example, the by motion of people or objects near the CMM 100. An environmental sensor 142 may also be a light detector configured to measure ambient light in the environment 102, which ambient light might, for example, interfere with the operation of an optical sensor or vision sensor. In yet another embodiment, an environmental sensor 142 may be sound sensor, such as a microphone, configured to detect sound energy in the environment.

Control System

Some embodiments of a CMM 100 include a control system 150 (or "controller" or "control logic") configured to control the CMM 100, and process data acquired by the CMM. FIG. 1C schematically illustrates an embodiment of a control system 150 having several modules in electronic communication over a bus 151.

In general, some or all of the modules may be implemented in one or more integrated circuits, such as an ASIC, a gate array, a microcontroller, or a custom circuit, and at least some of the modules may be implemented in non-transient computer-implemented code capable of being executed on a computer processor 157.

Some embodiments include a computer processor 157, which may be a microprocessor as available from Intel Corporation, or an implementation of a processor core, such as an ARM core, to name but a few examples. The computer processor 157 may have on-board, non-transient digital memory (e.g., RAM or ROM) for storing data and/or computer code, including non-transient instructions for implementing some or all of the control system operations and methods. Alternately, or in addition, the computer processor 157 may be operably coupled to other non-transient digital memory, such as RAM or ROM, or a programmable non-transient memory circuit for storing such computer code and/or control data. Consequently, some or all of the functions of the controller 150 may be implemented in software configured to execute on the computer processor 157.

The control system 150 includes a communications interface 152 configured to communicate with other parts of the CMM 100, or with external devices, such as computer 170 via communications link 176. To that end, communications interface 152 may include various communications interfaces, such as an Ethernet connection, a USB port, or a Firewire port, to name but a few examples.

The control system 150 also includes a sensor input 155 operably coupled to one or more sensors, such as a measuring sensor 140, camera 141, or environmental sensor 142. The sensor input 155 is configured to receive electronic signals from sensors, and in some embodiments to digitize such signals, using a digital to analog ("D/A") converter ("DAC"). The sensor input 155 is coupled to other modules of the control system 150 to provide to such other modules the (digitized) signals received from sensors.

The motion controller 153 is configured to cause motion of one or more of the movable features of the CMM 100. For example, under control of the computer processor 157, the motion controller 153 may send electrical control signals to one or more motors within the CMM 100 to cause movable features of the CMM 100 to move a measuring sensor 140 to various points within the measuring space 113 and take measurements of the workpiece 180 at such points. The motion controller 153 may control such motion in response to a measurement program stored in memory module 156, or stored in computer 170, or in response to manual control by an operator using manual controller 160, to name but a few examples.

Measurements taken by the CMM 100 may be stored in a memory module 156, which includes a non-transient memory. The memory module 156 is also configured to store, for example, a specification for a workpiece 180 to be measured; a specification for a calibration artifact; an error map; and/or non-transient instructions executable on the computer processor 157, to name but a few examples. Such instructions may include, among other things, instructions for controlling the movable features of the CMM 100 for measuring a workpiece 180 and/or a calibration artifact; instructions for analyzing measurement data; and/or instructions for correcting measurement data (e.g., with an error map).

The measurement analyzer module 154 is configured to process measurement data received from one or more sensors, such as measuring sensor 140, and/or environmental sensor 142. In some embodiments, the measurement analyzer module 154 may revise the measurement data, for example by modifying the measurement data using an error map, and/or compare the measurement data to a specification, for example to assess deviation between a workpiece 180 and a specification for that workpiece 180. To that end, the measurement analyzer module 154 may be a programmed digital signal processor integrated circuit, as known in the art.

Alternately, or in addition, some embodiments couple the CMM 100 with an external computer (or "host computer") 170. The host computer 170 has a computer processor such as those described above, and non-transient computer memory 174. The memory 174 is configured to hold non-transient computer instructions capable of being executed by the processor of external computer 170, and/or to store non-transient data, such as data acquired as a result of the measurements of an object 180 on the base 110.

Among other things, the host computer 170 may be a desktop computer, a tower computer, or a laptop computer, such as those available from Dell Inc., or even a tablet computer, such as the iPad™ available from Apple Inc. In addition to the computer memory 174, the host computer 170 may include a memory interface 175, such as a USB port or slot for a memory card configured to couple with a non-transient computer readable medium and enable transfer of computer code or data, etc. between the computer 170 and the computer readable medium.

The communication link 176 between the CMM 100 and the host computer 170 may be a hardwired connection, such as an Ethernet cable, or a wireless link, such as a Bluetooth link or a Wi-Fi link. The host computer 170 may, for example, include software to control the CMM 100 during use or calibration, and/or may include software configured to process data acquired during operation of the CMM 100. In addition, the host computer 170 may include a user interface configured to allow a user to manually operate the CMM 100. In some embodiments, the CMM and/or the host computer 170 may be coupled to one or more other computers, such as server 179, via a network 178. The network 178 may be a local area network, or the Internet, to name two examples.

Because their relative positions are determined by the action of the movable features of the CMM 100, the CMM 100 may be considered as having knowledge of the relative locations of the table 111, and the workpiece 180. More particularly, the computer processor 157 and/or computer 170 control and store information about the motions of the movable features. Alternately, or in addition, the movable features of some embodiments include sensors that sense the locations of the table 111 and/or measuring sensor 140, and report that data to the computers 222 or 150. The information about the motion and positions of the table and/or measuring sensor 140 of the CMM 100 may be recorded in terms of a one-dimensional (e.g., X, Y Z), two-dimensional (e.g., X-Y; X-Z; Y-Z) or three-dimensional (X-Y-Z) coordinate system referenced to a point on the CMM 100.

Manual User Interface

Some CMMs also include a manual user interface 160. As shown, the manual user interface 160 may have controls (e.g., buttons; knobs, etc.) that allow a user to manually operate the CMM 100. Among other things, the interface 160 may include controls that enable the user to change the position of the measuring sensor 140 relative to the workpiece 180. For example, a user can move the measuring sensor 140 in the X-axis using controls 161, in the Y-axis using controls 162, and/or in the Z-axis using controls 163.

If the measuring sensor 140 is a vision sensor, or if the CMM 100 includes a camera 141, then the user can manually move the sensor 140, camera 141, or change field of view of the vision sensor and/or camera using controls 165. The user may also focus the vision sensor and/or camera 141 using control 166 (which may be a turnable knob in some embodiments) and capture an image, or control recording of video, using control 167.

As such, the movable features may respond to manual control, or be under control of the computer processor 157, to move the table 111 and/or the measuring sensor 140 relative to one another. Accordingly, this arrangement is configured to present a workpiece 180 to the measuring sensor 140 from a variety of angles, and in a variety of positions.

Accuracy

The accuracy of operation of a CMM 100 may be characterized by several criteria. For example, the "repeatability" of a CMM 100 is a measure of its ability to accurately repeat a measurement of the same workpiece 180 under the same conditions (e.g., same measuring instrument; same observer; same measurement procedure; same location and environment of CMM 100, etc.) within a short period of time. The repeatability of a CMM 100 may be quantified as the variation of measurements taken by the CMM 100 when it repeatedly measures the same characteristic of the same workpiece 180.

The "reproducibility" of a measurement refers to the degree of agreement between measurements of the same workpiece 180 when the measurements are performed under different (i.e., non-identical) conditions within a short period of time. A statement of the reproducibility of a measurement includes a specification of the differences between measurements (e.g., a different principle of measurement; different observer; a different method of measurement; a different measuring instrument; different location and environment of CMM 100, etc.). The reproducibility of a measurement may be quantified as the variation between measurements of the same characteristic of the same workpiece 180 taken by different measurers using the same CMM 100.

The "associativity" of one measuring sensor 140 with another measuring sensor 140 refers to the degree of disagreement between their respective measurements of the same workpiece 180 under conditions that are the same, except for the use of the difference measuring devices. For example, if a calibrated workpiece 180 is measured using a contact probe, and the same calibrated workpiece 180 is subsequently measured by a vision sensor within a short period of time, their respective measurements ideally should be identical, but in practice will be different. The degree of associativity between the contact probe and a vision sensor may be quantified by the differences in their respective measurements of the calibrated workpiece 180.

Calibration

Typically, a CMM 100 is calibrated and recalibrated from time to time. The manufacturer of a CMM 100, or the owner or operator, a customer of the owner or operator of the CMM, or a regulatory agency, may specify that the CMM 100 be calibrated at certain time intervals. Alternately, or in addition, the operator of the CMM 100 may calibrate the CMM 100 in response to a change of location, a change of environment 102 (e.g., temperature; pressure, etc.), a change to the machine (e.g., replacing, or changing the type of, a measuring sensor 140), and/or a change of a programmed measuring process, to name but a few examples.

Generally, calibration may be described as assessing one or more measures of the accuracy of a CMM 100. Typically, calibrating a CMM 100 includes using the CMM 100 to measure a calibrated artifact, which is essentially a workpiece having known, highly-accurate dimensions, and comparing the measurements taken by the CMM 100 against those known dimensions. A difference between the measurements taken by the CMM 100 and the known dimensions of the calibrated artifact represents an inaccuracy.

If the calibration indicates that the CMM 100 meets a required specification (e.g., any identified inaccuracy is within a specified tolerance), the person performing the calibration may, for example, provide to the owner or operator a certificate certifying that the CMM 100 is calibrated.

If the calibration measurements indicate an inaccuracy, a technician may adjust a portion of the CMM 100, including one or more of its movable features, so that the inaccuracy is reduced or eliminated. Alternately, or in addition, subsequent measurement data produced by the CMM 100 may be mathematically adjusted in ways known in the art, to counteract the inaccuracy.

Figure 2B:
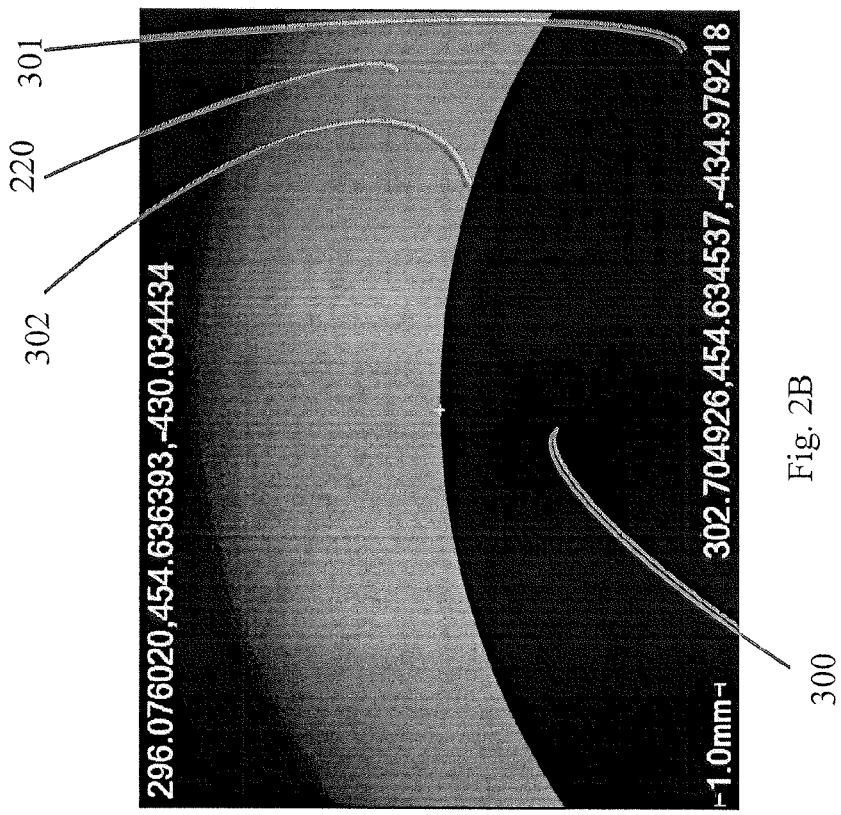
FIG. 2B is a photograph of an embodiment of a portion of a calibration artifact.
Figure 2A:
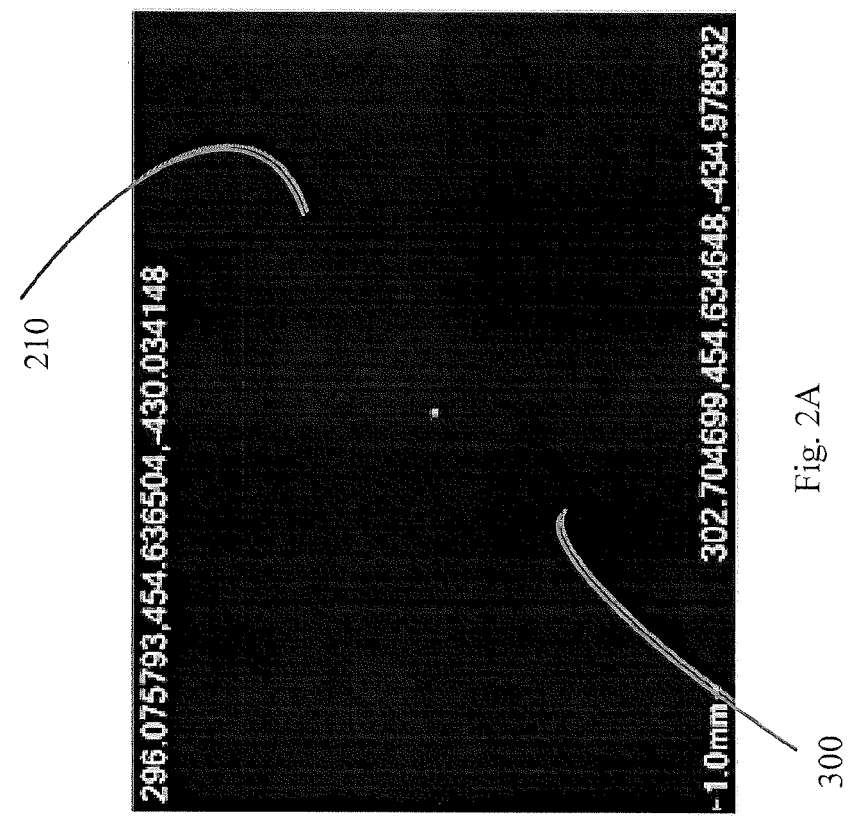
FIG. 2A is a photograph of an embodiment of a portion of a calibrated artifact.

FIG. 2A is a photograph of a calibrated standard, in the form of a sphere, which may be referred to a calibrated sphere 300, as seen by a vision sensor 320 without the benefit of various embodiments. A calibrated standard is a device having well-known dimensions, as known in the art for purposes of calibrating a CMM 100, and for assessing associativity of a plurality of probes.

It should be noted that embodiments herein are illustrated and described in terms of a calibrated sphere 300, but the calibrated sphere 300 is only an illustrative embodiment of a calibrated standard. A calibrated standard can have any shape, provided that the shape can produce a silhouette as described above. For example, a calibrated standard may be square, cubic, oval, or oblong, to name but a few examples.

As shown, the calibrated sphere 300 is effectively indistinguishable from its background 210, and is therefore not useful for calibrating a CMM, verifying performance of an optical sensor, assessing the associativity of different sensors, or measuring a workpiece 180.

In contrast, FIG. 2B is a photograph of a calibrated sphere 300 against a background 220 according to various embodiments, and FIG. 2C is a schematic illustration of an embodiment of a calibrated sphere 300 against a background 220 according to various embodiments. As shown in FIG. 2B and FIG. 2C, the calibrated sphere 300 is easily distinguishable from the background 220. More specifically, to a vision sensor, the edge 302 of the calibrated sphere 300, which is the surface 301 of the sphere 300 seen in profile or silhouette, is visibly distinct from the background 220.

Figure 3A:
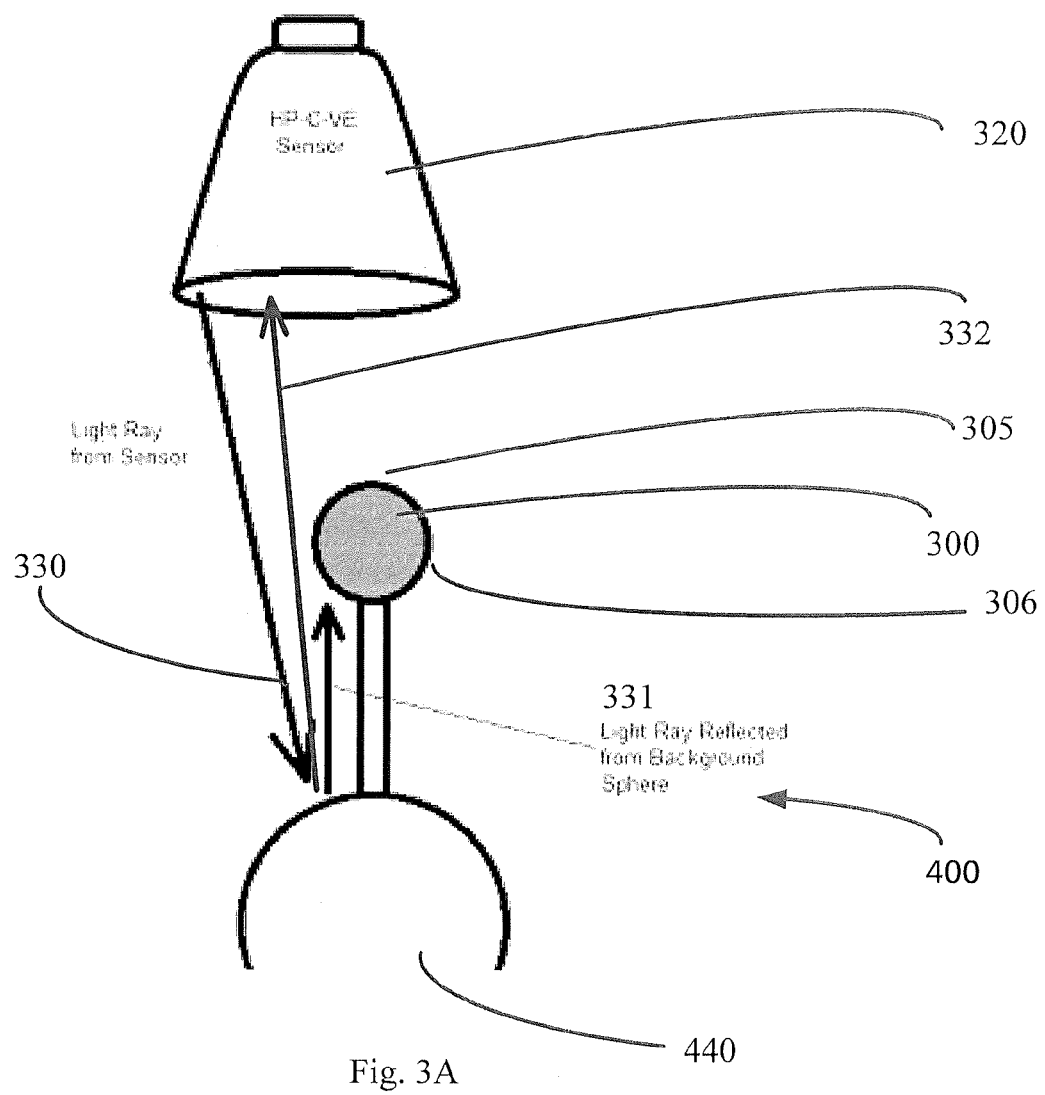
FIG. 3A schematically illustrates an embodiment of a measurement system with a conformance test artifact.
Figure 3B:
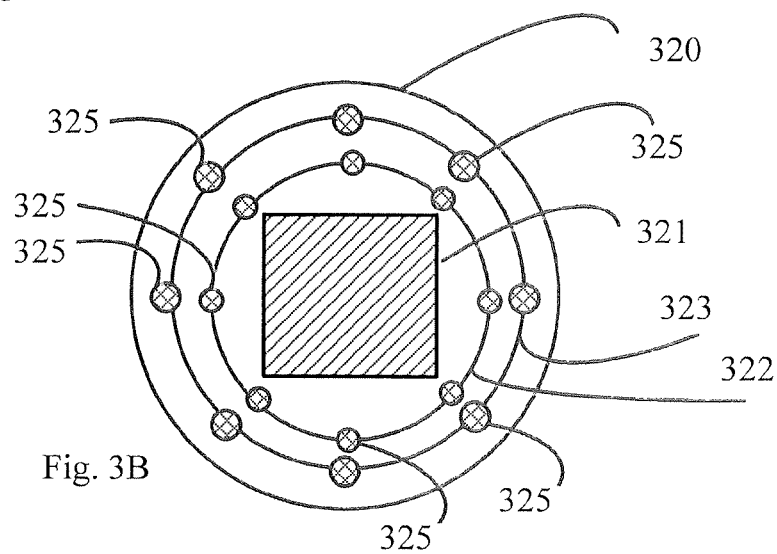
FIG. 3B schematically illustrates an embodiment of light rings of an embodiment of an optical measuring device.

FIG. 3A and FIG. 3B schematically illustrate features of portions of an embodiment of a conformance test artifact 400, along with a measuring sensor 140, which in this embodiment is a vision sensor 320. The vision sensor 320 operates by detecting edges defined by some contrast in the analysis of the pixels seen by the sensor's field of view (FOV). For example, vision sensor 320 probes points by "looking" at the part being measured (e.g., the artifact) and choosing the point where the part shows some (or the sharpest) contrast between the color of calibrated standard and its background. In illustrative embodiments, the image produced by the vision sensor 320 is in black and white, or greyscale, or is processed to be in black and white or greyscale. In such embodiments, the contrast appears between a black portion (e.g., the silhouette of calibrated sphere 300) and it's a white portion (e.g., the background). It should be noted that viewing the images in black and white, or grayscale, is not a requirement of the methods and systems described herein. Color images, in which the calibrated sphere 300 is visible in contrast to its background, may also be used.

The conformance test artifact 400 includes a calibrated standard (in illustrative embodiments, a calibrated sphere 300), which preferably has a low-reflectivity surface, and in preferred embodiments has a matte finish. In some embodiments, the calibrated sphere may be tungsten carbide with a matte finish. This material allows the vision sensor 320 to focus on the calibrated sphere 300. This sphere artifact 300 is black/dark grey and when it is viewed by the vision sensor 320 on its own; the sensor sees a black object against a black field (see, for example, FIG. 2A).

The calibrated sphere 300 is supported by a post 311. The post 311 has a length, and may have a variable length in order to facilitate changing to location of the calibrated sphere 300, for example relative to the background illuminator 440 and/or a vision sensor 320. Similarly, for the same reason, in some embodiments the post 311 is flexible, and may be bent or otherwise have its shape changed.

The conformance test artifact 400 also includes a background illuminator 440. In some embodiments, the background illuminator 440 is a convex background illumination surface configured to reflect incident light. Among other things, the convex background illumination surface may be the surface of a sphere, the surface of an ellipse, or the surface of a hemisphere, to name but a few examples. The convex shape of the background illumination surface reduces the risk that light reflected from that surface impinges on a sensor-facing portion of the surface of the calibrated sphere 300. In other embodiments, the background illumination surface may be flat, or even concave, yet preferably configured not to project light onto a sensor-facing portion the calibrated standard. To that end, the shape of the background illumination surface 440 may depend on the shape of the calibrated standard 300.

In other embodiments, the background illuminator 440 is a source of light, and is configured to produce light on a hemisphere 306 of a calibrated sphere 300 that faces away from a vision sensor 320. In preferred embodiments, such an embodiment has a convex light-emitting surface to reduce the risk that light emanating from the background illuminator 440 impinges on a sensor-facing portion of the surface of the calibrated standard (e.g., sphere 300). In other embodiments, the light-emitting surface may be flat, or even concave, yet preferably configured not to project light onto a sensor-facing portion of the calibrated standard. To that end, the shape of the background illuminator 440 may depend on the shape of the calibrated standard 300.

The background illuminator 440 is supported by an illuminator post 441. The background illuminator post 441 has a length, and may have a variable length in order to facilitate changing to location of the background illumination surface 440, for example relative to the calibrated sphere 300 and/or a vision sensor 320. Similarly, for the same reason, in some embodiments the background illuminator post 441 is flexible, and may be bent or otherwise have its shape changed.

The illuminator post 441 may be supported in a post aperture 443 in the base 410 (which, as described below, may be a carousel in some embodiments). In some embodiments, the base 410 includes more than one post aperture 443, and the location of the background illuminator 440 may be changed by moving the illuminator post 441 from one post aperture 443 to another.

Figure 4A:
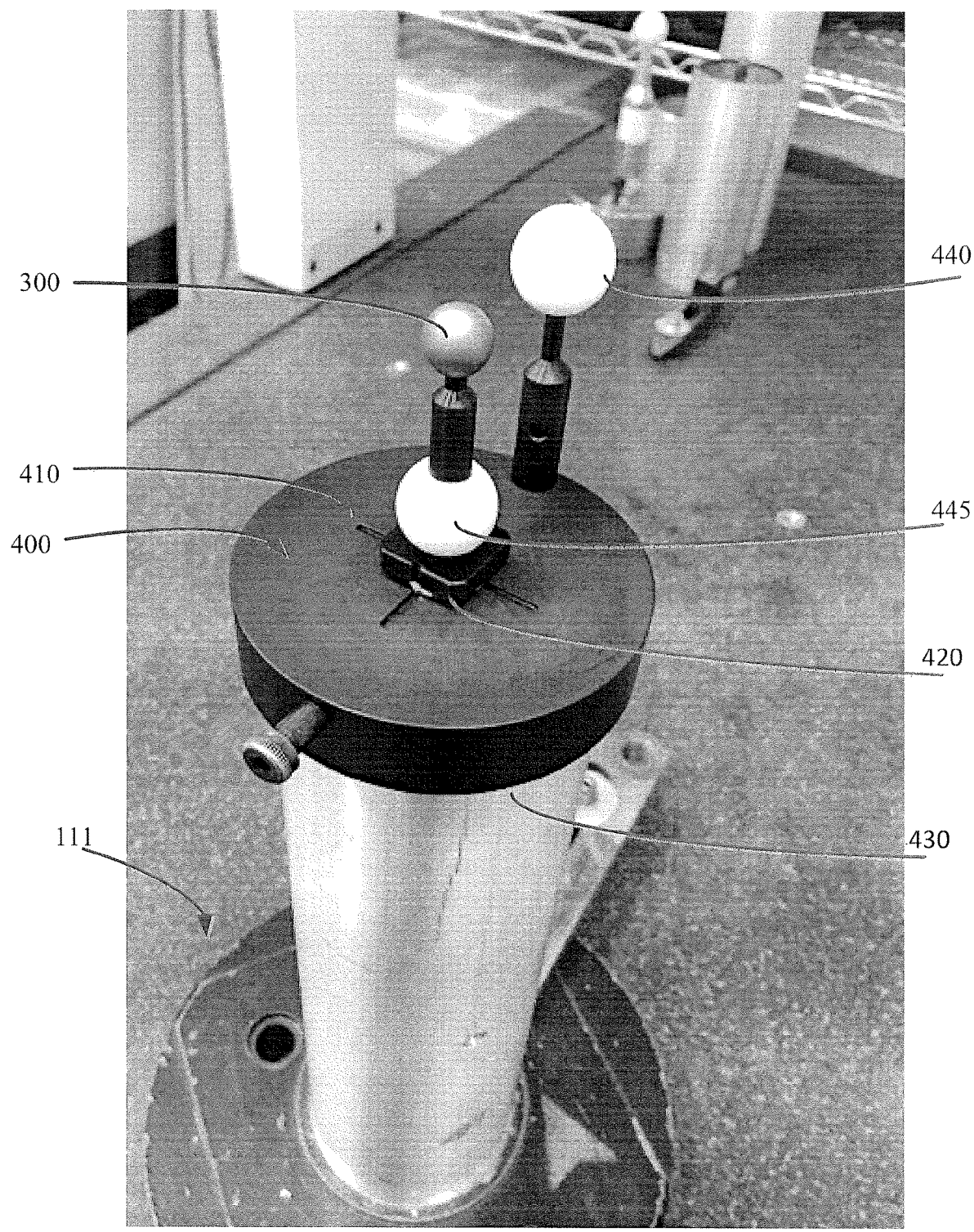
FIG. 4A is a photograph of an embodiment of a conformance test artifact.
Figure 4B:
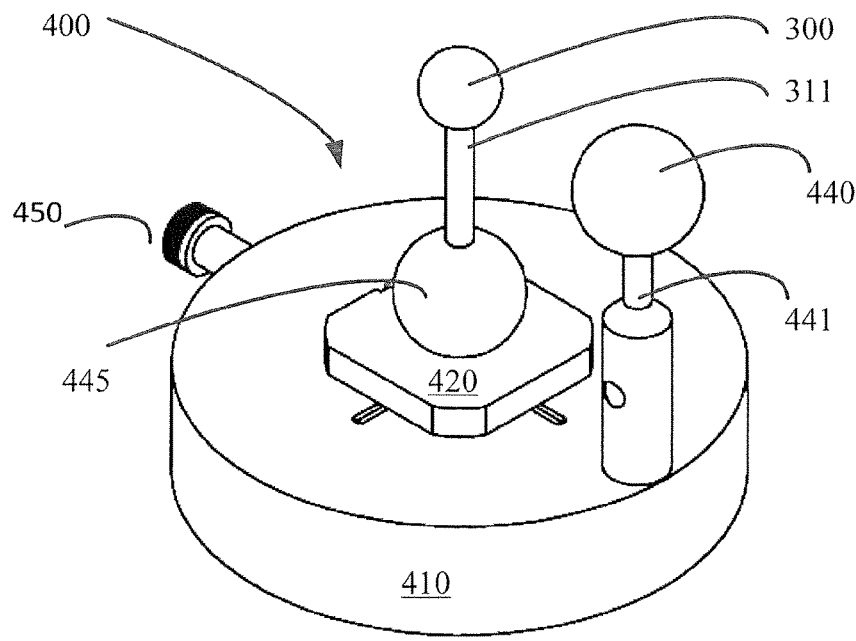
FIG. 4B schematically illustrates an embodiment of a conformance test artifact.
Figure 4C:
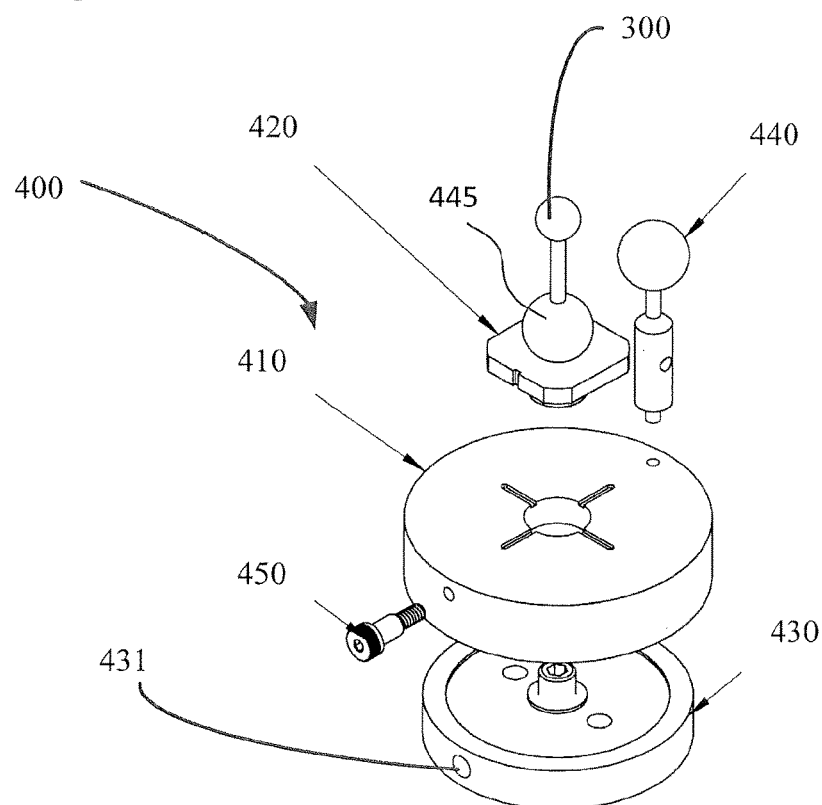
FIG. 4C schematically illustrates another view of an embodiment of a conformance test artifact.
Figure 4D:
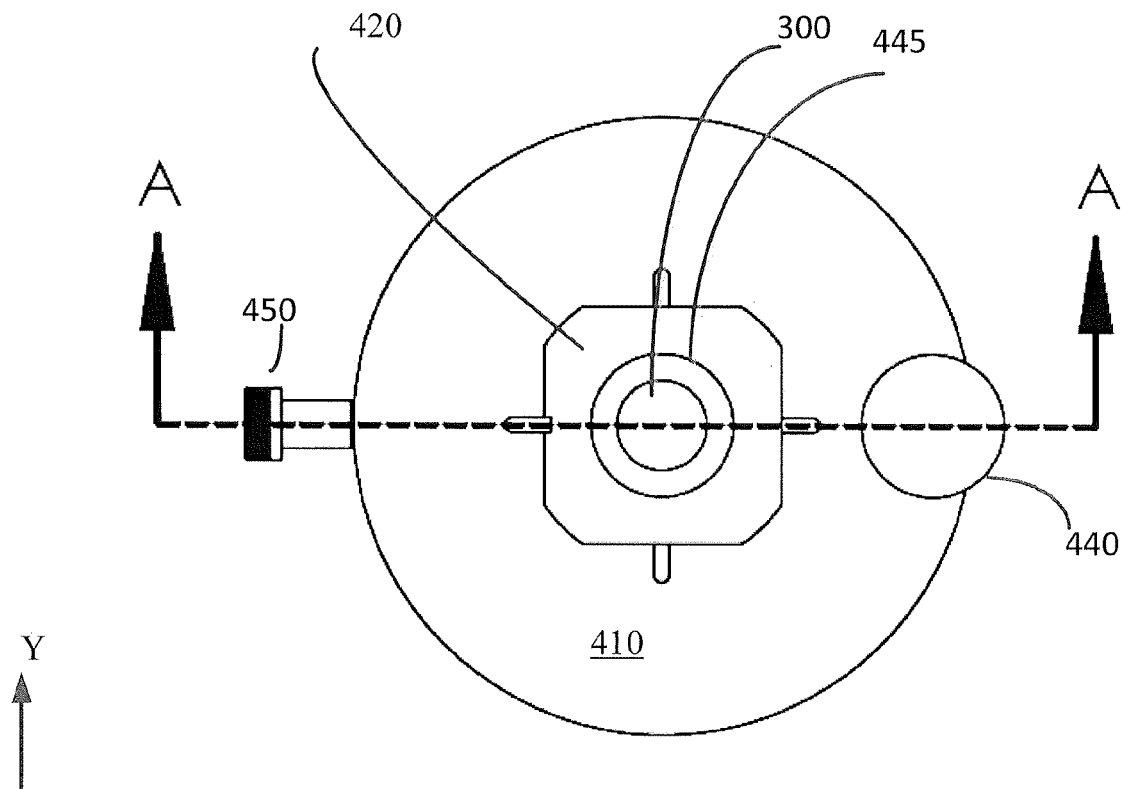
FIG. 4D schematically illustrates a top view of an embodiment of a conformance test artifact.
Figure 4E:
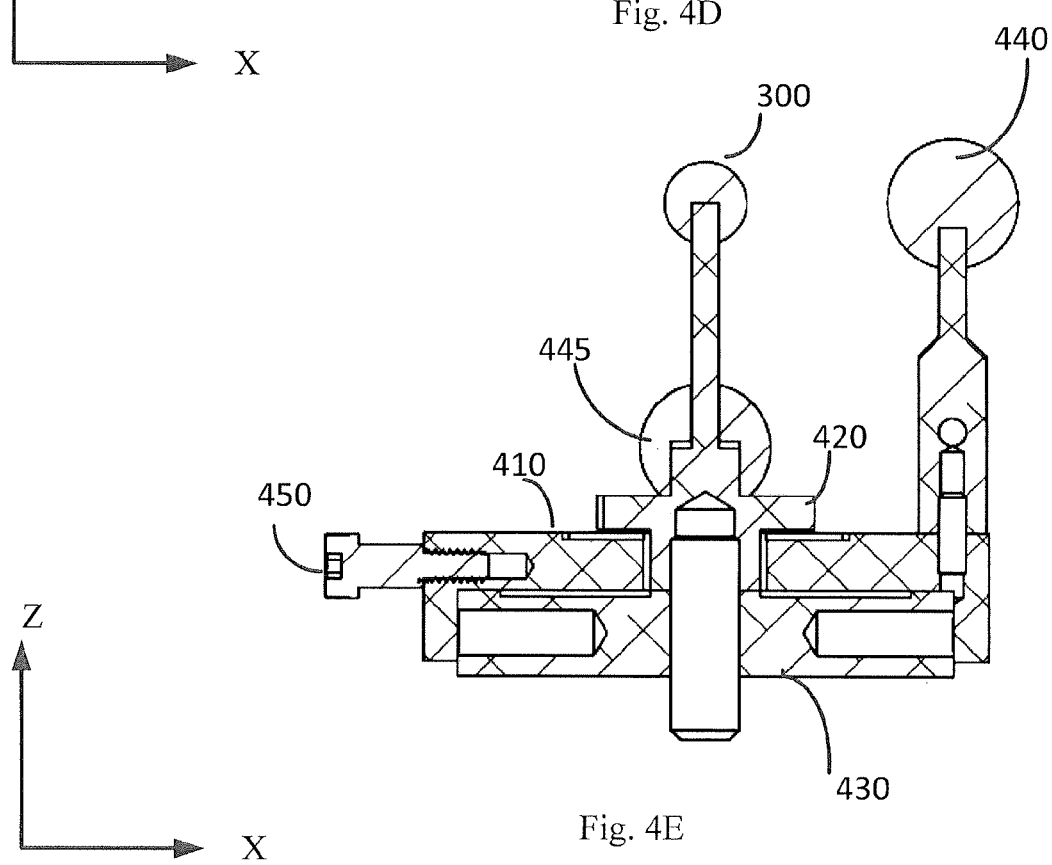
FIG. 4E schematically illustrates a cross-section view of an embodiment of a conformance test artifact.
Figure 4F:
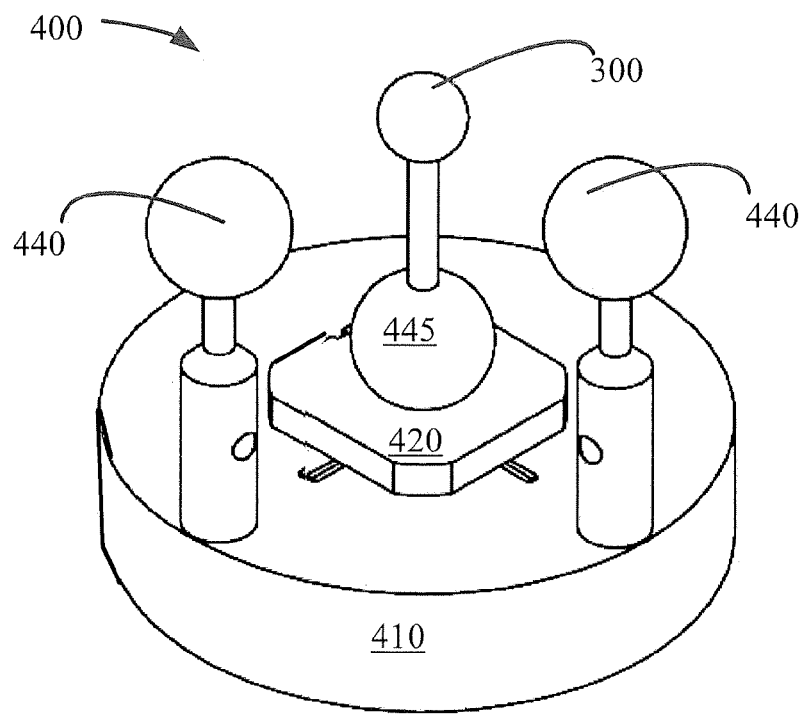
FIG. 4F schematically illustrates another embodiment of a conformance test artifact.

Some embodiments include two or more units of background illuminator 440, as schematically illustrated in FIG. 4F for example. In such embodiments, the posts 441 may be disposed in a corresponding number of post apertures 443.

Figure 4G:
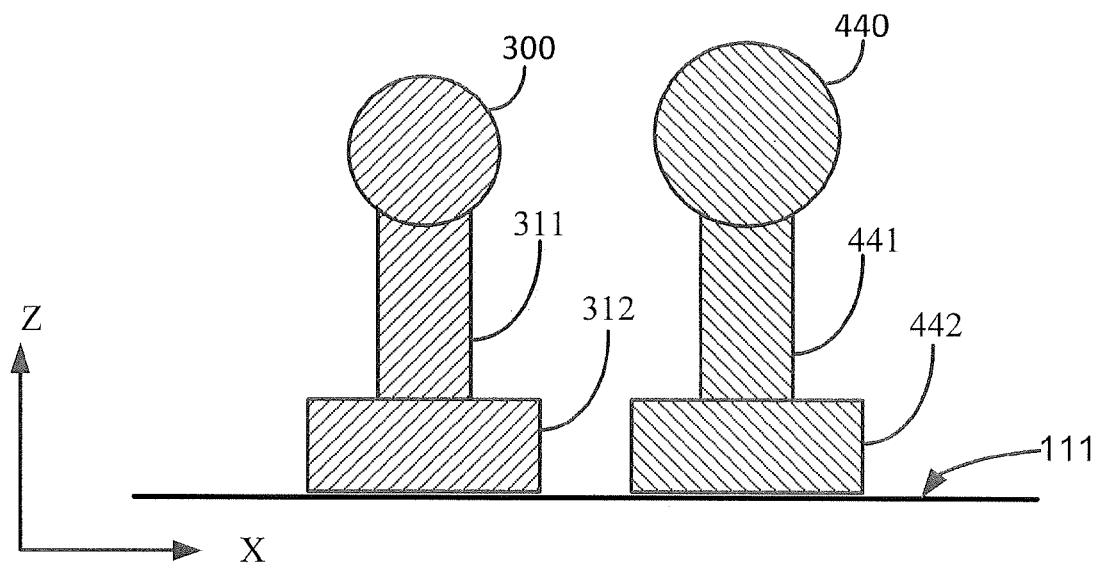
FIG. 4G schematically illustrates another embodiment of a conformance test artifact.

In some embodiments, the calibrated sphere 300 may be physically separate from, and independently movable with respect to, the background illuminator 440. This provides to an operator of the CMM 100 flexibility in the selection and arrangement of the calibrated sphere 300 and the background illuminator 440. One illustrative embodiment of is schematically illustrated in FIG. 4G, in which the calibrated sphere 300 is supported by base 312 via post 311, and in which the background illuminator 440 is supported by base 442 via post 441.

In use, the calibrated sphere 300 is positioned, at least in part, within the field of view of vision sensor 320, and preferably between the background illuminator 440 and the vision sensor 320. In general, the background illuminator 440 may be positioned so that a portion of the background illuminator 440 is visible to the vision sensor 320 (i.e., within the field of view of the vision sensor 320, and not entirely blocked by the calibrated sphere 300), or the background illuminator 440 may be concealed from the vision sensor 320 by the calibrated sphere 300.

In embodiments in which the background illuminator 440 is a convex background illumination surface, it reflects incident light (330). Some of the reflected light (e.g., portion 331) impinges on the calibrated sphere on a side opposite (facing away from) the vision sensor 320, while some of the reflected light (e.g., portion 332) impinges on light sensor 321 in the vision sensor 320, all resulting in an apparent silhouette at the light sensor 321 (such as illustrated in FIG. 2B, for example). In some embodiments, the convex background illumination surface does not reflect light onto the hemisphere (305) of the calibrated sphere 300 that faces the vision sensor 320, which may distort the image of the calibrated sphere 300. This is a direct consequence of the convex (e.g., spherical) geometry of the convex background illumination surface 440, which reflects light to the sensor from behind the calibrated sphere 300 while maintaining the "darkness" of the "sensor facing" hemisphere (305).

In embodiments in which the background illuminator 440 is a light source, the background illuminator produces light, some of which (represented in FIG. 3A by ray 331) impinges on the calibrated sphere 300, and some of which (represented in FIG. 3A by ray 332) reaches the vision sensor 320 to produce a silhouette of the calibrated sphere 300.

In some embodiments, the vision sensor 320 is a video sensor. Also, in some embodiments, the vision sensor 320 may include a light source, such as a ring of lights 322 (which may be referred to as a "ring light") surrounding a light sensor 321. Such embodiments may include two concentric rings (322, 323) of lights (325) surrounding light sensor 321. As such, the light source is associated with the vision sensor such that the light source moves with the light sensor 321. More specifically, in the embodiment of FIG. 3B, the light source is coupled to the vision sensor. In some embodiments, the CMM's controller can control such a ring light (322, 323) with the application software to facilitate developing (increasing) contrast on the artifact 400 which allows the sensor to detect the edge and probe a point. For example, the controller 150 may set or change when a ring light (322 or 323) is illuminated, the intensity of the illumination, and/or the spectrum of the illumination, etc.

FIGS. 4A-4E schematically illustrate another embodiment of a conformance test artifact 400 standing on the table 111 of a CMM. In this embodiment, the conformance test artifact 400 includes a carousel 410 mounted to a carousel base 430. The calibrated sphere 300 is suspended from the carousel 410 by a calibrated sphere post 311 and a mounting pad 420, which in this embodiment is removably coupled to the carousel 410.

The background illuminator 440 is suspended from the carousel. In this embodiment, the background illuminator 440 is at substantially the same height (relative to the carousel) as the calibrated sphere 300 but in some embodiments, the height of the background illuminator 440, and/or the height of the calibrated sphere 300, are adjustable via their respective posts 441 and 311.

In some embodiments, the carousel 410 is movably coupled to the base 430, such that the carousel 410 may rotate relative to the base 430, so that the background illuminator 440 moves relative to the table 111 but the calibrated sphere 300 remains substantially stationary relative to the table 111. To that end, some embodiments include a control post 450, as schematically illustrated in FIG. 4A. The control post 450 may serve as a handle to assist a user in turning, moving, or orienting the carousel 410. In other embodiments, the control post 450 is a set post configured to mate with the carousel 410 and secure the carousel 410 in a fixed position relative to the base 430. To change the position of the carousel, an operator loosens or removes the control post 450, moves the carousel to a new position, and tightens or re-installs the set post 450. Among other things, the control post 450 may include a set screw. In other embodiments, the control post 450 is a peg that fits through an aperture 411 in the carousel 410, and mates with a corresponding aperture 431 in the base 430.

FIG. 4D schematically illustrates an embodiment of a conformance test artifact 400, and FIG. 4E schematically illustrates a cross-section of the conformance test artifact 400 along section A-A.

Figure 5A:
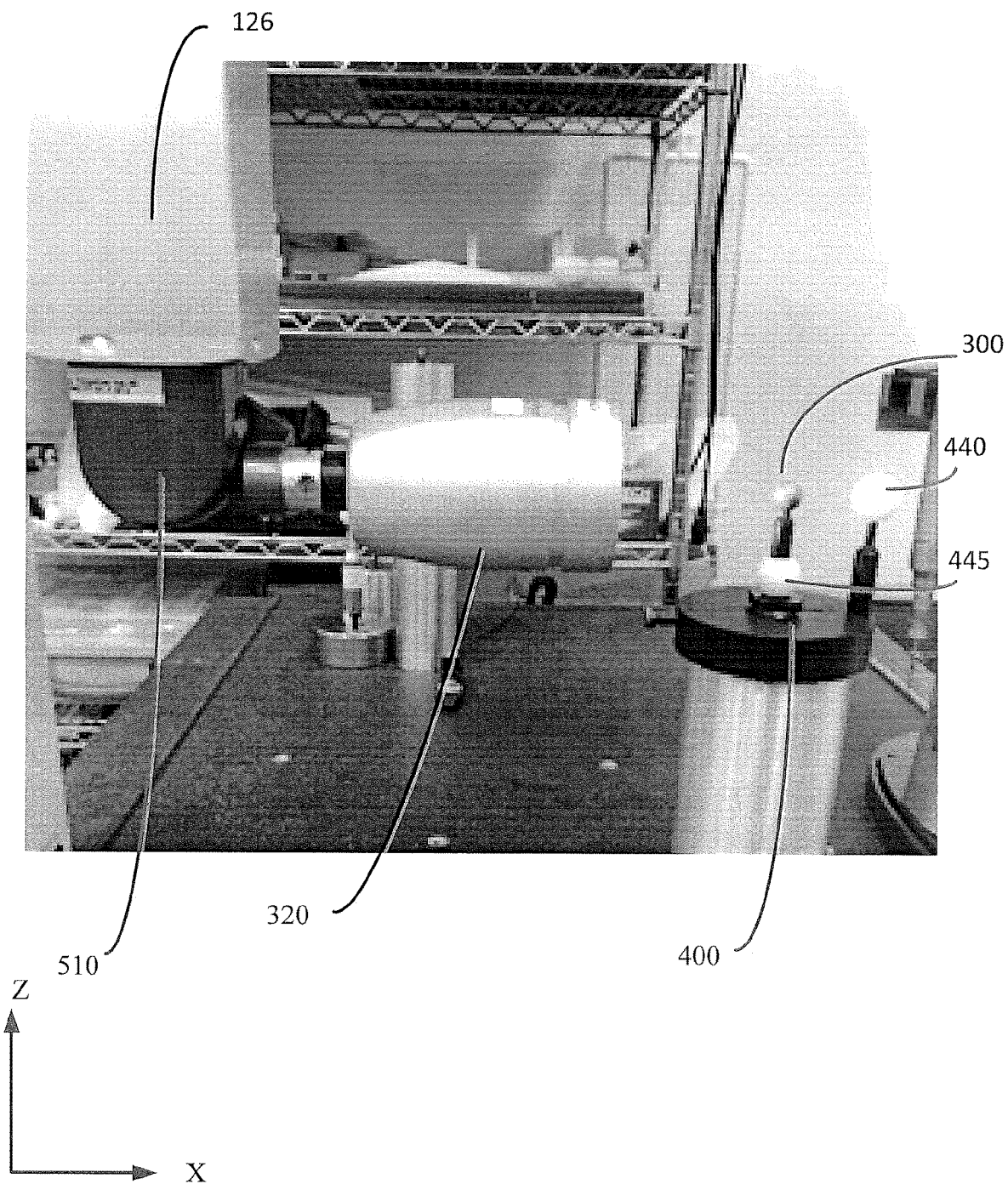
FIG. 5A is a photograph of an embodiment of a conformance test artifact with a camera at a first wrist angle.

FIG. 5A is a photograph of an embodiment of the conformance test artifact 400 being measured by the vision sensor 320. In this embodiment, the vision sensor 320 is suspended from a spindle 126 by a movable joint 131, which may be referred to as a "wrist" 510. In FIG. 5A, the vision sensor is oriented along the X axis.

As shown in FIG. 5A, light from the vision sensor 320 impinges the convex background illumination surface of a background illuminator 440. As explained above, some light reflected from the convex background illumination surface is absorbed by the calibrated sphere 300, while some light reflected from the convex background illumination surface reaches light sensor 321 in the vision sensor 320 to form a silhouette of calibrated sphere 300.

In some embodiments, if the calibrated sphere 300 is not positioned between the vision sensor 320 and the background illuminator 440, the background illuminator 440 may be moved by adjusting the carousel 410 as described above, so that the calibrated sphere 300 is positioned between the vision sensor 320 and the background illuminator 440.

Figure 5B:
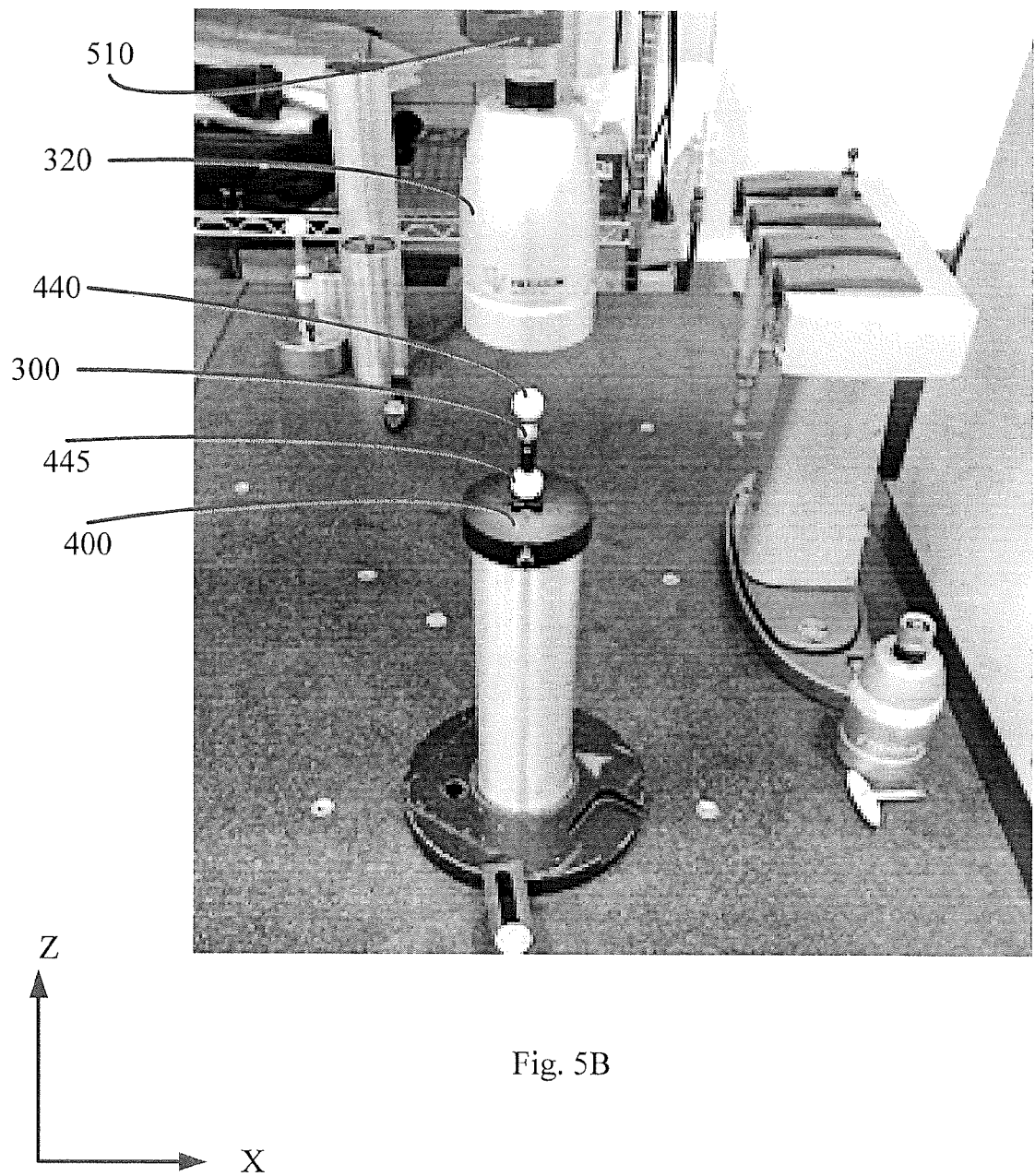
FIG. 5B is a photograph of an embodiment of a conformance test artifact with a camera at a second wrist angle.

FIG. 5B is a photograph of an embodiment of the conformance test artifact 400 being measured by the vision sensor 320 configured at a different angle than the angle in FIG. 5A. In this embodiment, the vision sensor 320 is directly above the calibrated sphere 300 (i.e., in the Z axis). Some light reflected from the convex vertical reflector 445 is absorbed by the calibrated sphere 300, while some light reflected from the convex vertical reflector 445 reaches light sensor 321 in the vision sensor 320 to form a silhouette of calibrated sphere 300.

Figure 6A:
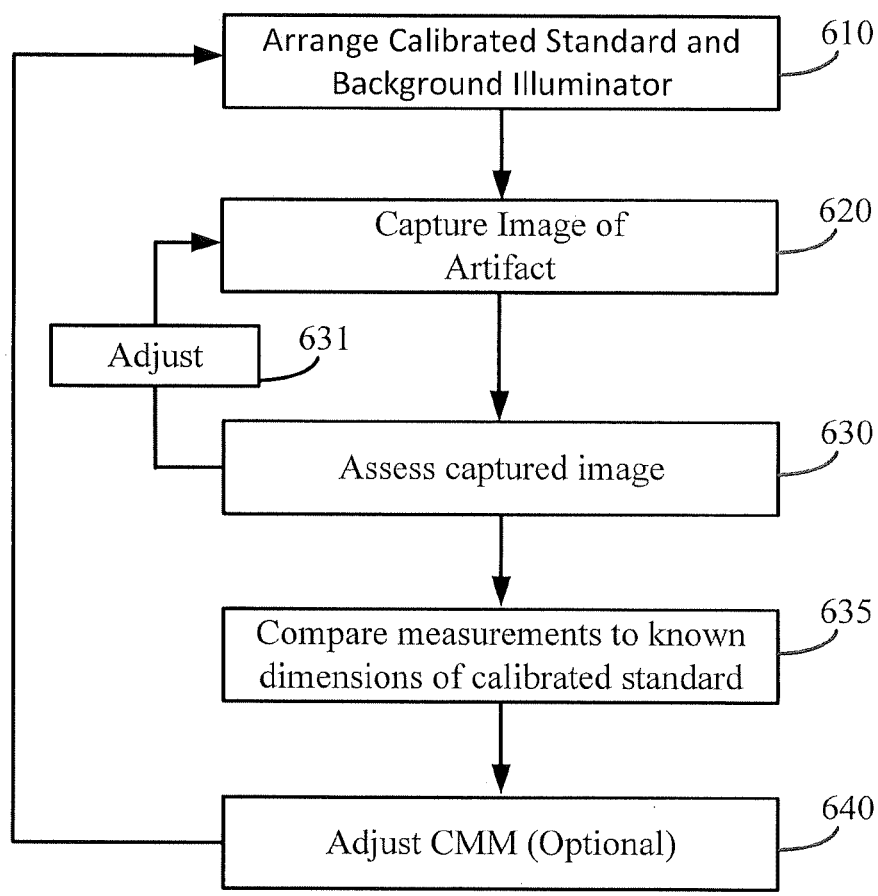
FIG. 6A is a flow chart illustrating a method of using a conformance test artifact for calibrating a CMM.

FIG. 6A is a flow chart illustrating a method of using illustrative embodiments of a conformance test artifact 400 to calibrate a CMM 100 using a vision sensor 320. In addition to its other qualities, the calibrated sphere 300 has precise, known dimensions, as known in the art of calibration artifacts.

At step 610, the method includes orienting the vision sensor 320 relative to the calibrated sphere 300 so that the calibrated sphere 300 is within the field of view of the vision sensor 320. This may include moving the vision sensor 320 relative to the calibrated sphere 300, and/or moving the calibrated sphere 300 relative to the vision sensor 320, for example by adjusting the length or shape of the calibrated sphere post 311. In preferred embodiments, no light from the background illuminator 440 impinges on the side 305 of the calibrated sphere 300 facing the vision sensor 320. To that end, in preferred embodiments, the calibrated sphere 300 is between the background illuminator 440 and the vision sensor 320.

Step 620 includes capturing one or more still images, or video images, of the calibrated sphere 300.

In some embodiments, step 630 includes assessing the contrast between the calibrated sphere 300 and its background. For example, step 630 may include assessing the sharpness of the distinction in the silhouette of the calibrated sphere 300.

In some embodiments, step 631 includes adjusting one or more aspects of the conformance test artifact 400 and or the CMM 100 to improve the image captured by the vision sensor 320. For example, some embodiments increase the contrast by adjusting the illumination of the background illuminator 440, e.g., by controllably adjusting the lights 325 in embodiments in which the background illuminator is a passive reflector, or the light output of the background illuminator 440 itself in embodiments in which the background illuminator 440 is an active light source. Alternately, or in addition, some embodiments change the location of the vision sensor 320, or the angle at which the vision sensor 320 looks at the calibrated sphere 300.

At step 635, the method uses the image of the calibrated sphere 300 captured by the vision sensor 320 to compare the measurements of the calibrated sphere 300 to the known dimensions of the calibrated sphere 300, and to compare any discrepancy between the measurements and the known dimensions to a tolerance specified in a specification for the CMM 100 and/or the vision sensor 320 and/or the workpiece 180 to be measured.

At step 640, the method optionally includes making adjustments to the CMM, using methods known in the art.

Optionally, after step 640, the method may repeat the previous steps using the same conformance test artifact 400. For example, some embodiments repeat some or all of the steps after re-orienting the test artifact 400, relative to the vision sensor 320, to a second position (e.g., a second wrist angle; see for example a first such position in FIG. 5A, and a second such position in FIG. 5B).

Figure 6B:
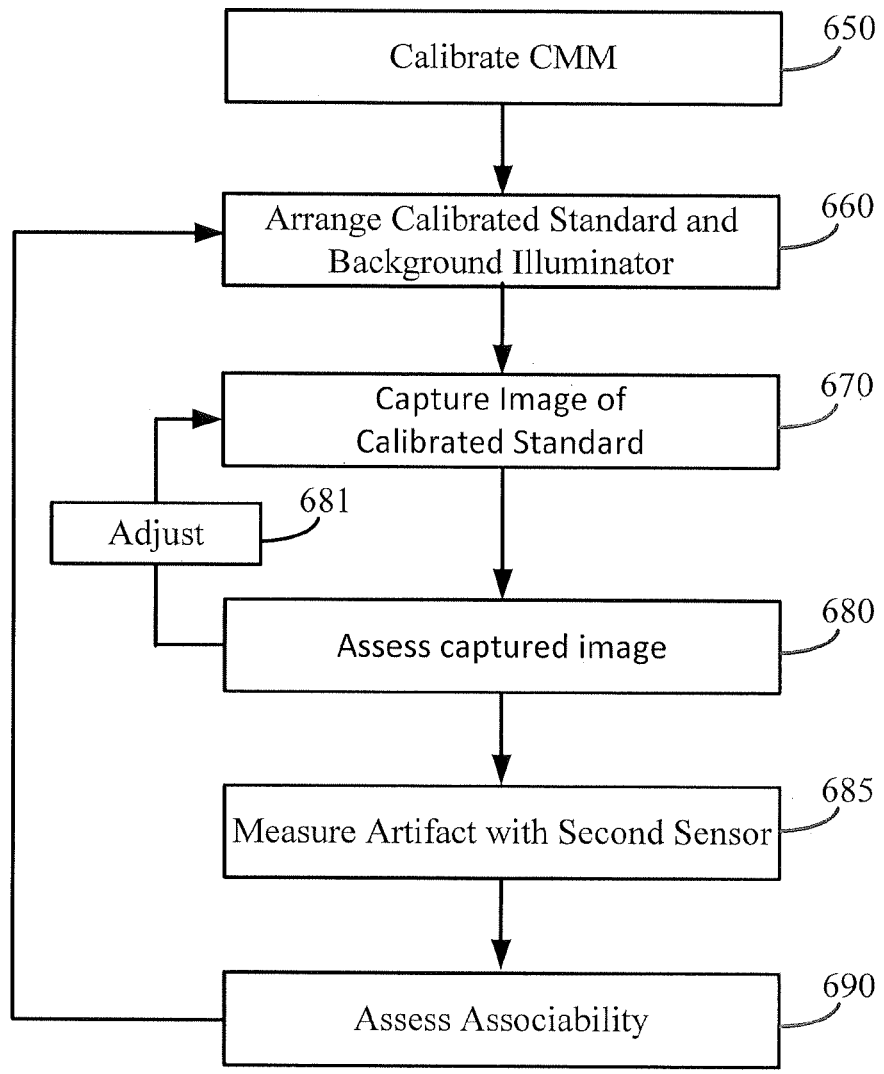
FIG. 6B is a flow chart illustrating a method of using a conformance test artifact for assessing associativity of sensors.

FIG. 6B is a flow chart illustrating a method of using illustrative embodiments of a conformance test artifact 400 to test associativity of a plurality of sensors.

Step 650 includes calibrating the CMM 100 in ways known in the art, or as described above. In preferred embodiments, the following steps are performed using a conformance test artifact 400 that is not the same artifact used for in the calibration step 650.

After the CMM 100 has been calibrated, step 660 of the method includes orienting the vision sensor 320 relative to the calibrated sphere 300 so that the calibrated sphere 300 is within the field of view of the vision sensor 320. This may include moving the vision sensor 320 relative to the calibrated sphere 300, and/or moving the calibrated sphere 300 relative to the vision sensor 320, for example by adjusting the length or shape of the calibrated sphere post 311. In preferred embodiments, no light from the background illuminator 440 impinges on the side 305 of the calibrated sphere 300 facing the vision sensor 320. To that end, in preferred embodiments, the calibrated sphere 300 is between the background illuminator 440 and the vision sensor 320.

At step 670, the method captures one or more images of the calibrated sphere 300 using the vision sensor 320.

At step 680, the method assesses the captured image of the calibrated sphere 300 using methods known in the art to produce a first set of associativity measurements.

Some embodiments also assess the contrast between the calibrated sphere 300 and its background, which may include assessing the sharpness of the distinction in the silhouette of the calibrated sphere 300. Such embodiments include step 681, which includes adjusting one or more aspects of the conformance test artifact 400 and or the CMM 100 to improve the image captured by the vision sensor 320. For example, some embodiments increase the contrast by adjusting the illumination of the background illuminator 440, e.g., by controllably adjusting the lights 325 in embodiments in which the background illuminator is a passive reflector, or the light output of the background illuminator 440 itself in embodiments in which the background illuminator 440 is an active light source. Alternately, or in addition, some embodiments change the location of the vision sensor 320, or the angle at which the vision sensor 320 looks at the calibrated sphere 300.

In some embodiments, step 680 includes re-orienting the test artifact 400, relative to the vision sensor, to a second position (e.g., a second wrist angle; see for example a first such position in FIG. 5A, and a second such position in FIG. 5B), and measuring the calibrated standard with the vision sensor for a second time.

At step 685, the method measures the calibrated sphere 300 with the second measuring sensor 140, to produce a second set of associativity measurements. The calibrated sphere 300 is the same one measured by the vision sensor 320 in step 680.

The second measuring sensor 140 may be another vision sensor, or may be a tactile probe, non-contact probe, or optical probe, to name but a few examples. In preferred embodiments, the only difference in the CMM 100 between steps 680 and 685 is the change of measuring sensor 140. In some embodiments, step 680 includes exchanging the vision sensor 320 for the second measuring sensor 140 by placing the vision sensor 320 on the probe rack 115 and replacing it with a second measuring sensor 140 from the probe rack 115. In some embodiments, step 685 is performed before step 680.

Then at step 690, the method uses the first set of measurements and the second set measurements to assess the associativity of the vision sensor 320 and the second sensor 140, using methods known in the art. For example, step 690 may include comparing measurements of the calibrated sphere 300 taken by the vision sensor to measurements of the same calibrated sphere 300 taken by the second measuring sensor 140 to assess the differences between such measurements.

Alternately, in some embodiments, at step 685 the method measures the calibrated sphere 300 a second time with the same vision sensor 320, but from a different angle (see, for example, FIG. 5A and FIG. 5B), to produce second set of associativity measurements. Indeed, in some embodiments, the step 685 measures the calibrated sphere 300 more than two times (e.g., three times; four times; five times). In such embodiments, step 690 asses the associativity of the vision sensor 320 to itself. The associativity of a measuring sensor 140 to itself may be referred-to as the sensor's "self-associativity."

As part of assessing the associativity, some embodiments compare the associativity to a standard. For example, a specified standard for associativity may arise in a specification for a CMM 100, or in a specification for a workpiece 180, or in a specification for a measurement to be performed on a workpiece 180. In some embodiments if the associativity does not meet the specified standard, the method may include remedial action, such as changing one or more sensors 140, or calibrating and/or adjusting a sensor 140 or other part of the CMM 100.

The following is a list of some reference numbers used herein:

- 100: coordinate measuring machine;
- 101: floor;
- 102: environment;
- 110: base;
- 111: table;
- 112: plane;
- 113: measurement envelope;
- 115: rack;
- 120: movable features;
- 121: bridge legs;
- 122: table scale;
- 123: bridge;
- 124: bridge scale;
- 125: carriage;
- 126: spindle;
- 127: spindle scale;
- 128: bearing;
- 130: arm;
- 131: movable joint;
- 132: rotary encoder;
- 140: measuring sensor;
- 141: camera;
- 142: environment sensor;
- 150: control system;
- 151: bus;
- 152: communications interface;
- 153: motion controller;
- 154: measurement analyzer;
- 155: sensor input;
- 156: memory;
- 157: computer processor;
- 160: user interface;
- 161: X-axis controls;
- 162: Y-axis controls;
- 163: Z-axis controls;
- 165: camera motion controls;
- 166: camera focus control;
- 167: camera record control;
- 170: host computer;
- 171: screen;
- 172: keyboard;
- 173: mouse;
- 174: computer memory;
- 175: memory interface/communications port;
- 176: communication link;
- 178: network;
- 179: server;
- 180: workpiece;
- 181: geometry;
- 182: edge;
- 183: corner;
- 184: flat surface;
- 185: curved surface;
- 186: cavity;
- 187: inside angle;
- 188: waviness;
- 189: surface finish;
- 210: dark background 220: illuminated background
300: calibrated sphere
301: surface of calibrated sphere in profile
302: edge of surface of calibrated sphere as seen in silhouette
305: hemisphere of calibrated sphere facing toward vision sensor;
306: hemisphere of calibrated sphere facing away from vision sensor;
311: calibrated sphere post
312: calibrated sphere base
320: optical measuring device or video sensor
321: optical sensor
322: inner ring of lights
323: outer ring of lights
330: light ray from optical measuring device
331: light ray reflected to calibrated sphere
332: light ray reflected to optical measuring device
400: conformance test artifact
410: carousel
411: aperture in carousel
420: mounting pad;
430: carousel base
431: aperture in base
440: background illuminator
441: background illuminator post
442: background illuminator base
443: background illuminator mounting aperture;
445: vertical reflector
450: post, set peg, or screw
510: wrist Definitions As used in this description and any accompanying claims, the following terms shall have the meanings indicated, unless the context otherwise requires:

A "silhouette" is an image of an object such that the periphery of the object is optically distinguishable from its background. For example, a silhouette of a dark sphere against a light background would appear as a circle, with the outer edge of the circle revealing the periphery of the sphere.

An object has a surface that is a "passive reflector" if the object's surface reflects incident light, but the object does not generate light.

A "calibrated sphere" is a sphere having fixed, known dimensions. A calibrated sphere may be useful, for example, in calibrating a CMM.

Various embodiments may be implemented at least in part in any conventional computer programming language. For example, some embodiments may be implemented in a procedural programming language (e.g., "C"), or in an object oriented programming language (e.g., "C++"). Other embodiments of the invention may be implemented as a pre-configured, stand-along hardware element and/or as preprogrammed hardware elements (e.g., application specific integrated circuits (ASICs), programmable gate arrays (e.g., FPGAs), and digital signal processor integrated circuits (DSPs), or other related components.

In an alternative embodiment, the disclosed apparatus and methods (e.g., see the various flow charts described above) may be implemented as a computer program product for use with a computer system. Such implementation may include a series of computer instructions fixed either on a tangible, non-transitory medium, such as a computer readable medium. The series of computer instructions can embody all or part of the functionality previously described herein with respect to the system. For example, some embodiments may be implemented by a processor (e.g., a microprocessor integrated circuit; digital signal processor integrated circuit) executing, or controlled by, instructions stored in a memory. The memory may be random access memory (RAM), read-only memory (ROM), flash memory or any other memory, or combination thereof, suitable for storing control software or other instructions and data.

Those skilled in the art should appreciate that such computer instructions can be written in a number of programming languages for use with many computer architectures or operating systems. Furthermore, such instructions may be stored in any memory device, such as semiconductor, magnetic, flash, optical or other memory devices, and may be transmitted using any communications technology, such as optical, infrared, microwave, or other transmission technologies.

Among other ways, such a computer program product may be distributed as a removable medium with accompanying printed or electronic documentation (e.g., shrink wrapped software), preloaded with a computer system (e.g., on system ROM or fixed disk), or distributed from a server or electronic bulletin board over the network (e.g., the Internet or World Wide Web). In fact, some embodiments may be implemented in a software-as-a-service model ("SAAS") or cloud computing model. Of course, some embodiments of the invention may be implemented as a combination of both software (e.g., a computer program product) and hardware. Still other embodiments of the invention are implemented as entirely hardware, or entirely software.

Although the above discussion discloses various exemplary embodiments, it should be apparent that those skilled in the art can make various modifications that will achieve some of the advantages of the invention without departing from the true scope of the inventions.

What is claimed is:

1. A test artifact for calibrating a vision CMM, the test artifact comprising:
   a base configured to rest on a table of the CMM;
   a calibrated standard suspended from the base; and
   a convex background illumination surface suspended relative to the base to be positionable such that the calibrated standard is between the background illumination surface and a vision sensor, wherein the convex background illumination surface is reflective, and creates the silhouette by reflecting light towards the vision sensor.

2. The test artifact of claim 1 wherein the convex background illumination surface comprises a hemisphere.

3. The test artifact of claim 1 wherein the convex background illumination surface comprises a sphere.

4. The test artifact of claim 1 wherein the light reflected from the convex background illumination surface includes diverging beams of light reflected towards the vision sensor.

5. The test artifact of claim 1, wherein the light is generated by the vision sensor and transmitted towards the convex background illumination surface.

6. The test artifact of claim 1 wherein the convex background illumination surface is movable with respect to the calibrated standard, without moving the calibrated standard relative to the base.

7. The test artifact of claim 1 wherein the convex background illumination surface is moveably positionable relative to the calibrated standard.

8. The test artifact of claim 1 further comprising a reflective hemisphere positioned between the base and the calibrated standard.

9. The test artifact of claim 1 wherein the convex background illumination surface is a passive reflector.

10. The test artifact of claim 1 further comprising a reflective hemisphere in a fixed position between the base and the calibrated standard such that a line normal to the base passes through the reflective hemisphere and the calibrated standard.

* * * * *